Figure 1:
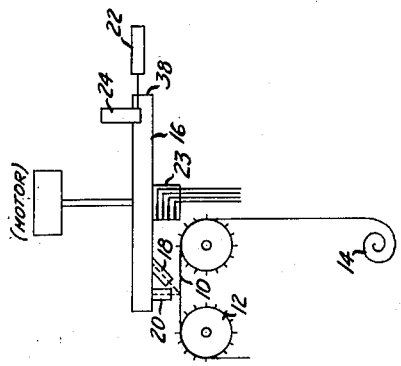

Sept. 4, 1962 L. F. MILLER 3,052,800
AUTOMATIC CHART READER
Filed Dec. 13, 1960 4 Sheets-Sheet 1

INVENTOR
Lee F. Miller
BY George Renehan
ATTORNEY

INVENTOR
Lee F. Miller

BY George Renehan
ATTORNEY

Sept. 4, 1962 L. F. MILLER 3,052,800
AUTOMATIC CHART READER
Filed Dec. 13, 1960 4 Sheets-Sheet 3

INVENTOR
Lee F. Miller
BY George Renehan
ATTORNEY

INVENTOR
Lee F. Miller

United States Patent Office 3,052,800
Patented Sept. 4, 1962

3,052,800
AUTOMATIC CHART READER
Lee F. Miller, Frederick, Md., assignor to the United States of America as represented by the Secretary of the Army
Filed Dec. 13, 1960, Ser. No. 75,642
9 Claims. (Cl. 250—219)
(Granted under Title 35, U.S. Code (1952), sec. 266)

The invention described herein may be manufactured and used by or for the Government of the United States of America for governmental purposes without the payment to me of any royalty thereon.

The invention relates to an automatic chart reader which extracts data from graphical strip charts such as those made by roll chart recorders or other sources of curve presentations. The readout information from this machine is suitable for feeding into standard data recording and processing equipment such as digital printers, tape and card punches, class interval sorters and digital counters.

An object of the invention is to provide a chart reader which reads out, in serial order, an appropriate train of digital pulses for each readout point along the curve as the chart feeds through the machine.

This form of serial pulse train readout makes it possible to directly accumulate in a digital counter, the running total of a chosen number of readout points along a given length of chart. From this running total, and the number of readings taken, the mean ordinate for the selected length of chart is directly obtainable.

Another object of the invention is to provide a readout which is suitable for feeding directly into a digital type of class interval sorting and distributing circuit. Thus each readout take nalong a selected length of chart may be classified into any one of a large number of class intervals, depending on its value. The resulting presentation would be in the form of a histogram of the length of chart read.

A further object of the invention is to provide a simple, reliable and accurate scheme for setting up the desired scale factors for the readout values. An example of this is the matching of readout values to the ruled scale divisions on the chart paper or to the scale divisions appearing on an instrument used to monitor the recorded data.

Another object of the invention is to provide for the setting up of non-linear scale factors to match certain chart paper rulings and meter scales as found in A.C. recorders and meters as well as special rulings which are used to read directly in pH units, watts, resistance or conductance.

A further object of the invention is to provide a direct means for linearizing the readout values to compensate for non-linear characteristics of many transducers used to collect curve data, such as wind speed indicators based on heated thermocouples.

Another object of the invention is to provide a chart reader which will function while being slowly operated manually so that individual readout values might be visually checked to thereby facilitate initial adjustment as well as to check for accuracy at any time.

A further object of the invention is to provide a machine which will read out two values, one representing the distance from the chart base line up to the inked trace and the other value including additionally the width of the inked trace. This second readout value is desirable when reading charts which have very small slopes of the inked trace, since it provides two figures from which the mean value of the two readings may be derived. This feature is especially useful in that it allows the reading of solid central inked areas resulting from very slow chart advance speeds.

Figure 2:
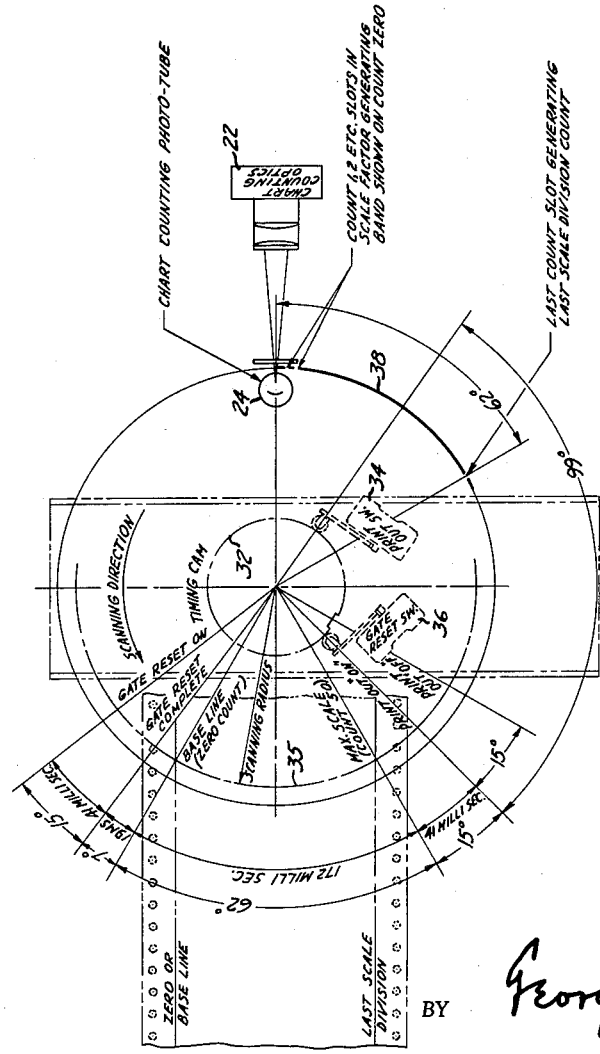
Figure 3:
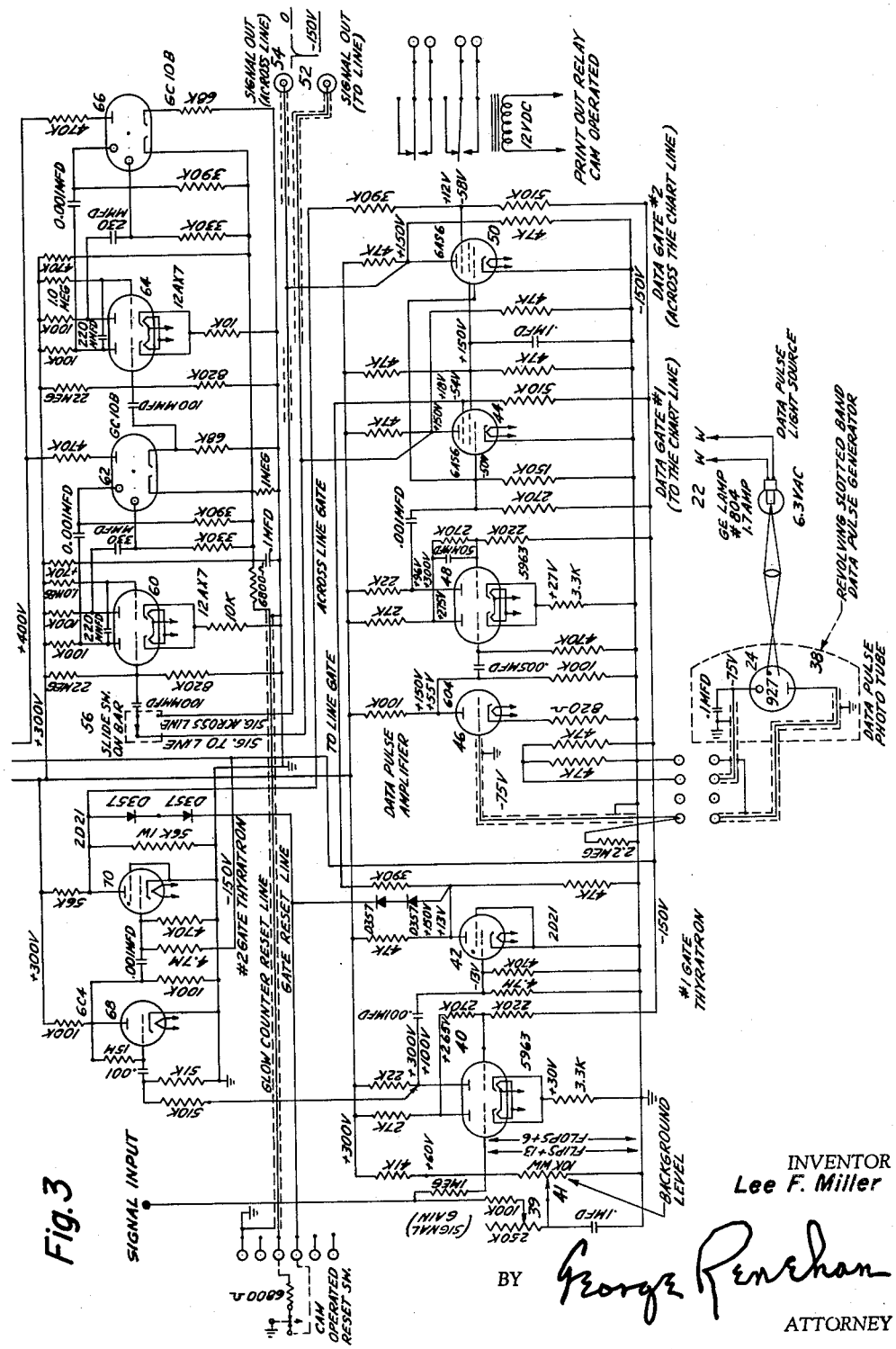
Figure 4:
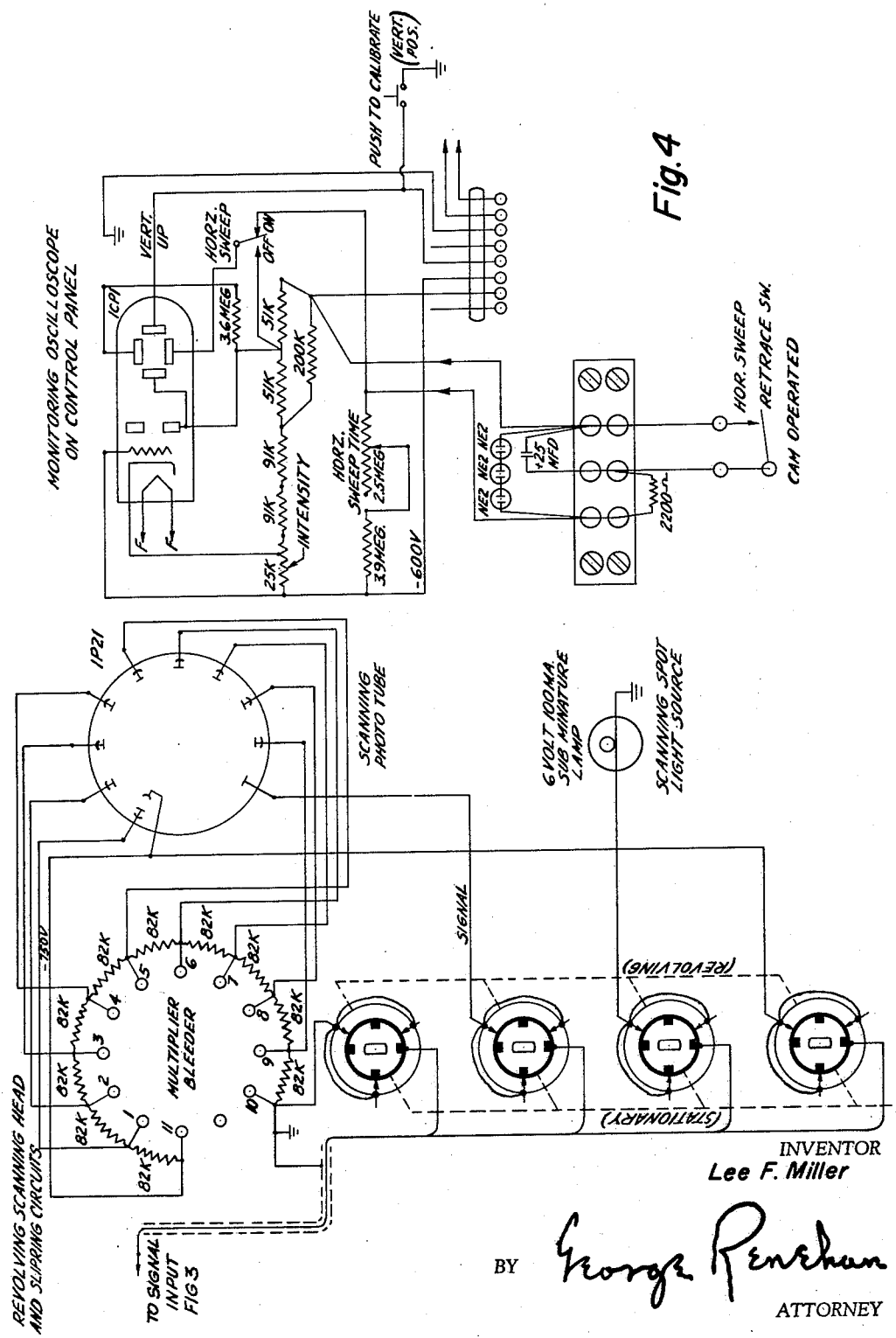
Figure 5:
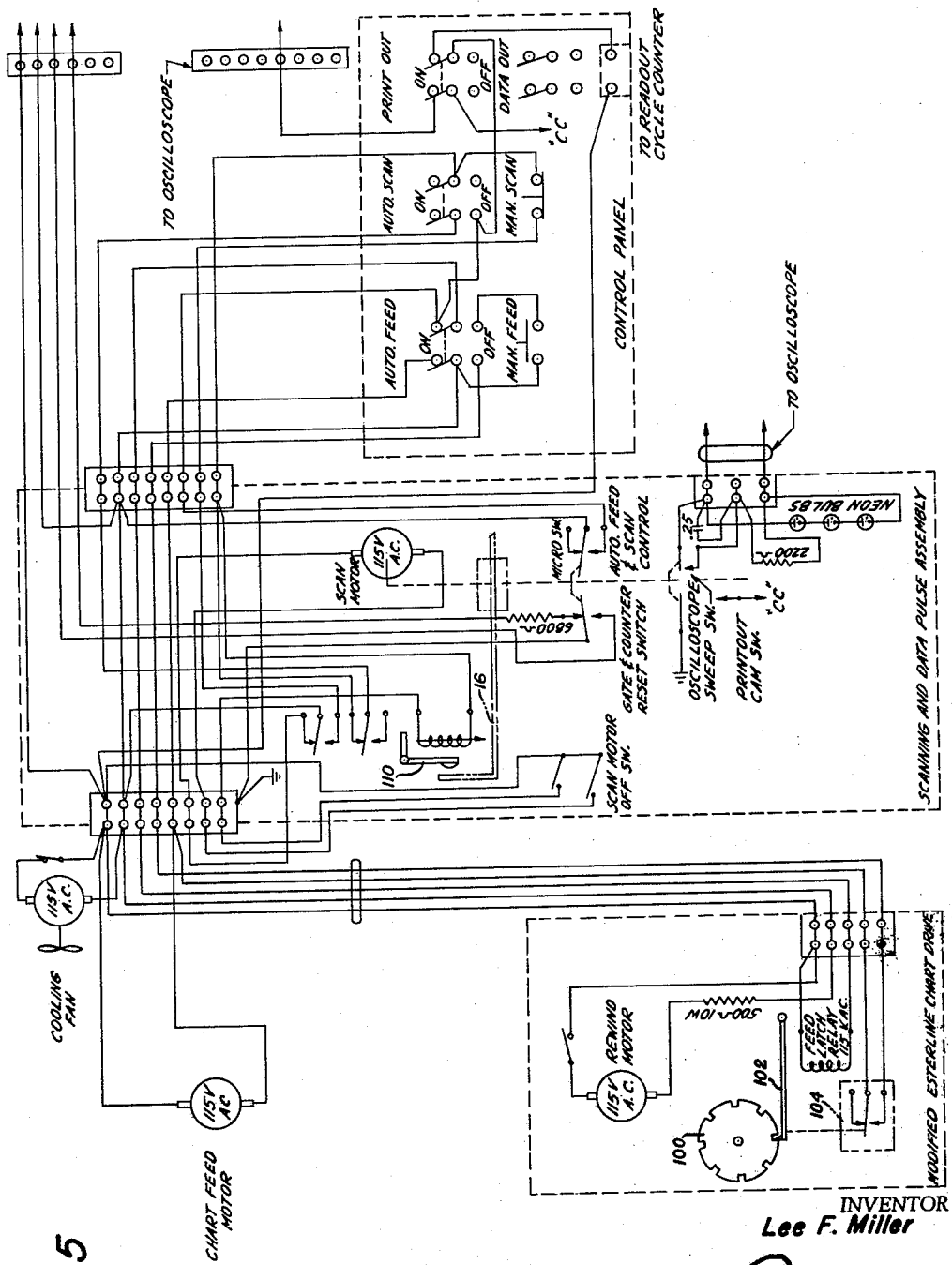

All these objects are accomplished by a combined mechanical, electronic unit, shown in FIG. 1 to FIG. 5 of the drawings. FIG. 1 shows a general schematic of the apparatus. FIG. 2 is a timing chart showing the initiation and the termination of the several events performed by the apparatus. FIG. 3 is an electronic circuit diagram of the device. FIG. 4 shows the circuit details of the monitoring oscilloscope, the photo tube and commutator. FIG. 5 shows the overall power wiring diagram of the apparatus. One of the principal elements of this unit of FIG. 1 is the scanning disc 16. This disc which is an inverted flanged turntable driven by a motor, is fitted near its periphery with a combined photo-optical scanning head. This head contains a light and lens assembly 18 for providing a highly illuminated spot of light that traverses a chart 10 as the disc is turned. In combination with the light source and lens assembly is a photoelectric cell 20 that is positioned to receive the reflected light from the chart surface. Both the light source and the photoelectric cell are one unit assembly attached to and rotating with the turntable. Attached to the hub of the turntable is a 4 lead commutator 23 to supply current for the light and to remove the signal from the photoelectric cell.

In association with the turntable is another light source 22 which focuses a spot of light on the turntable rim. Within the turntable and supported apart from it is a photoelectric cell 24. Normally the light from 22 is obscured by the turntable rim except where perforations occur. At each perforation the light beam reaches photoelectric cell 24 and results in a single pulse output. A segment of the rim may be replaced by a uniformly perforated data pulse band and the resulting data pulses serve to measure the progress of the scanning head across the chart as the turntable rotates.

The chart is removed from supply roll 14 and is drawn step-wise over scanning area 10 by means of sprocket 12. As turntable 16 rotates, light 18 sweeps across the chart with the reflected light being observed by photo cell 20. When the light traverses a trace on the chart, the difference in reflected light is sufficient to produce two pulses, one when the beam reaches the trace and a second pulse when the beam leaves the trace and returns to the white paper. Accordingly, as light 18 starts the sweep across the chart, the light from light source 22 actuates photocell 24 and subsequently uniformly spaced perforations along this portion of the turntable rim produce a succession of data pulses until photocell 20 "sees" the trace on the chart, at which time the circuit is blocked, data pulses cease to be transmitted and the accumulator count which represents the position of the trace on the chart may be registered. Successive counts, as the chart is moved stepwise along, gives a numerical series representing the shape of the trace.

FIG. 2 shows a timing chart including a top view of the scanning disc positioned over the chart and shows the angular positions at which the several events are initiated for a specific size and type of chart. Shown also is a timing cam on the scanning disc, which cam operates a reset switch to restore circuit conditions for each scanning revolution and a print out switch which serves to initiate a print out operation of the single scanning count in an ancillary apparatus, not shown.

Light source 22 and photocell 24 is also shown, together with perforated data pulse band 38. This band, which is detachable and adjustable, occupies a segment of the turntable rim approximately equal to the segment that sweeps the active portion of the chart surface. Thus the first perforation of the data pulse band will pass light source 22 and photocell 24 simultaneously with the passage of the scanning beam across the first division line of the chart. Similarly, the last perforation will pass as the scanning beam passes the last scale division of the chart. Similarly, for each scale division of the chart a perforation will appear under light source 22. By this means, a pulse will be emitted by photocell 24 as the scanning beam passes each scale division on the chart. Such scale divisions, when they are printed on the chart, are in a color to which photocell 20 is not responsive. To accommodate different chart forms, different perforated data pulse bands are provided. Non-uniformly perforated bands may be used for the purpose of linearizing the output data to compensate for the non-linear characteristics of some transducers.

An electronic circuit amplifies and transmits these data pulses until a pulse from photocell 20 indicates that the trace on the chart is reached, at which time the circuit is blocked and the accumulated count representing scale divisions on the chart may be registered after the completion of each scan.

FIG. 3 shows the circuit diagram of the unit including the data pulse generator and circuit. The revolving scanning head with the four contact slip ring commutator, the current supply to the scanning spot light 18, and the signal circuit from the phototube as well as the monitoring oscilloscope is shown in FIG. 4.

The data pulse generator circuit composed of the data pulse light source 22, the slotted data pulse band 38 and the phototube 24 constitute the basic data pulse mechanism of the circuit. The pulses from tube 24 are amplified in triode 46, and passed through Schmitt trigger 48 after which it passes to the grids of both 44 and 50 as a differentiated + and − spike. The latter control tubes have a fixed bias of about −50 volts on the grids which holds the tubes at cut-off. When the + spike arrives from tube 48 it drives them into the conducting region whereupon the plate voltage drops from the +150 shown, to a low value. The resulting signal, which is a − spike is carried to output jacks 52 and 54 respectively. Therefore, as the turntable rotates and the scanning light crosses the trace on the chart, a series of pulses will appear at jacks 52 and 54. Simultaneously with their appearance at the output jacks, the same data pulses are also fed to switch 56 which permits a selection of either output for feeding through a double triode amplifier 60 into a "units" glow counter 62. The latter in turn feeds into a "tens" glow counter 66 via double triode driver 64. These glow counters are capable of counting up to 99 pulses and are usually sufficient to measure any chart that may have to be read. These tubes give visible evidence of the operation of the equipment and serve as a constant monitor of the magnitude of the output signals.

Photomultiplier 20 has a high negative output of −30 or more volts when scanning a white paper. The signal from this tube is passed to the Schmitt trigger 40 which has a square wave output. The first grid of this double triode Schmitt trigger is biased to about +30 whereby the grid will be at about zero potential when the phototube is over white paper. The biasing of this tube is accomplished by potentiometer 41. The moment phototube 20 "sees" the inked trace on the chart its negative output drops to half or less, resulting in an effective + signal of perhaps 15 volts. Since this tube is set to "flip" at an arbitrary value of about 13 volts, the 15 volt signal will actuate the tube making the first half conducting. This state of affairs continues as long as the phototube "sees" the trace. When it again encounters white paper, the effective + voltage drops, ultimately to zero. As it passes +6 volts, which is another arbitrary setting, the circuit "flops" with the second half becoming conducting and the first half non-conducting, thus resulting in a square wave output. This setting of potentiometer 41 to compensate for a "white paper" signal is a convenient way of getting a + signal to the tube and choosing circuit parameters to provide a "flip" and "flop" at +13 and +6 volts respectively, offers a convenient means of overcoming effects of circuit noise and other irregularities. This square wave output is differentiated into a + and − spike through the .001 mfd. coupling condenser. The following thyratron 42 is biased at −13 and responds only to the + spike which fires the tube. When the tube comes conducting the plate voltage drops from +150 to +13 and this voltage drop is transferred to the suppressor grid of the control gate tube 44 whereby this tube is blocked and made non-responsive to the data pulses appearing on its grid. The same square wave output of trigger 48 is also fed to phase inverter 68, then differentiated into a − and + spike and passed to thyratron 70. In this case, due to phase inversion, the lagging spike is positive and fires the thyratron, the resulting voltage drop being fed to the suppressor grid of control tube 50. Thus the rise of the scanning signal wave front blocks the data pulses in tube 44 whereas the fall of the scanning wave blocks the data pulses in tube 50. By these two circuits, therefore, we have the means of blocking the separate counting circuits which measure the total number of scale divisions traversed by the scanning spot from the chart base line up to the recorded trace or from the chart base line across the recorded trace. Where the trace is a simple line, this is a relatively unimportant difference as the two pulses will occur almost simultaneously, but when "reading" highly condensed data with low line slope due to the prolonged recording on a short length of chart, it offers a ready means of securing a median value for the data.

The output signals at jacks 52 and 54 are fed out to self contained data printers or other equipment that records a permanent and continuous record of the position of the trace on the chart. Where a trace is highly condensed as mentioned above, it may result in essentially a solid band on the chart. In such a case it is often advantageous to secure 2 readings, which may represent values "up to the trace" and "over the trace" in each case. The median of these two quantities can have considerable value and has been found experimentally to be closely related to values that result from reading a less condensed trace.

A further detail in FIG. 4 shows a monitoring oscilloscope. This tube gives a visual representation of the signal emerging from the photomultiplier. By its means it is possible to set the signal level at control 39 and the background level at 41 at an optimum value that will exclude all noise signals, yet will be responsive to any reasonable trace on the chart.

FIG. 5 shows a wiring diagram of the apparatus including the chart drive, the scanning and data pulse assembly and the control panel switches. The chart drive consists of a geared motor coupled to the drive sprocket by means of a slipping coil spring tensioned belt. The other end of the sprocket drive is geared to a notched indexing sprocket 100 which is held in position by a spring biased latched assembly 102. This latch is retractable by means of relay 104 whereupon the slipping belt drive will advance the chart drive one notch on the index wheel. By utilizing two sizes of index wheels and a series of change gears it is possible to secure chart advance increments of from .025 to .5 inch. This feed and stop cycle is timed so that the chart rests for about 200 milliseconds during each scanning cycle. The scanning turntable revolves at about 1 revolution per second, which means that the chart must be scanned within about 70° or less of turntable rotation. The scanning and timing assembly circuitry includes a relay operated brake assembly 110 which serves to engage the rim of the turntable and prevent free rotation after the instrument is turned off.

A group of switches is shown on the control panel. These make it possible to independently operate the chart advance, scanning and printout functions of the machine. Thus by closing the manual feed and manual scan switches it is possible to operate these functions independently of all others. Switch 36 (FIG. 2) is actuated after each printout and prior to each scanning cycle. Switch 34 initiates printout following the completion of each scan.

Voltage and filament supplies are conventional and are not illustrated. Also, the drawings show terminal strips in their entirety whether or not each terminal is in actual use. Connections between the different circuit units are labeled.

I claim:

1. Apparatus for reading and evaluating a trace on a chart, which apparatus comprises a scanning means, including in combination, a point light source and a photocell, said photocell being positioned in cooperation with said light source to receive light reflected from a chart surface by said light source to thereby emit a pulse when said scanning means traverses a trace on said chart, mechanical means for sweeping said scanning means across said chart said mechanical means including a flanged turntable positioned adjacent said chart, to which turntable the scanning means is attached, photoelectric data pulse means in cooperation with said mechanical means for producing a series of data pulses during the traversal of the chart by said scanning means said data pulse means including a series of evenly spaced perforations in the flange of said turntable, said data pulse means including further a second light source positioned on one side of said perforated flange and a second photocell positioned opposite said second light source on the opposite side of said perforated flange, said second photocell serving to emit data pulses as the second light source is interrupted by the perforated flange of the revolving turntable, electronic means for receiving and processing said data pulses from said data pulse means and scanning pulses from said scanning means, said electronic means serving to block the data pulses emitted by the data pulse means upon receiving a scanning pulse from the scanning means, further electronic means for counting and registering said data pulses each time the scanning means traverses said chart.

2. Apparatus in accordance with claim 1 wherein the electronic means includes a series of glow counter tubes on which the data pulses are registered for monitoring purposes.

3. Apparatus in accordance with claim 1 wherein the rotating turntable actuates a reset switch to restore circuit conditions every revolution of the turntable.

4. Apparatus in accordance with claim 1 wherein the electronic means for receiving scanning pulses includes a bias adjusting means whereby the response can be tailored to exclude ambient background noise.

5. Apparatus in accordance with claim 1 wherein the electronic means includes vacuum tubes and wherein the blocking of timing pulses is accomplished by blocking a grid in one of said vacuum tubes.

6. Apparatus in accordance with claim 1 wherein the electronic means includes a first circuit for receiving a first scanning pulse generated when the scanning means reaches the chart trace and a second circuit for receiving a second scanning pulse generated when the scanning means leaves the chart trace.

7. Apparatus in accordance with claim 6 wherein the data pulses are fed through separate circuits to two independent outputs and wherein said first scanning pulse is fed to one of said timing pulse circuits and said second scanning pulse is fed to the second of said timing pulse circuits.

8. Apparatus in accordance with claim 1 including means for step-wise advancement of the chart to be read.

9. Apparatus in accordance with claim 3 wherein the rotating turntable further actuates a print out switch for controlling ancillary apparatus to register the total data pulse count every revolution of the turntable.

References Cited in the file of this patent

UNITED STATES PATENTS 2,907,997     Corwin et al. _____ Oct. 6, 1959
2,968,793     Bellamy _____ Jan. 17, 1961